United States Patent [19]

Sauer et al.

[11] Patent Number: 5,092,929
[45] Date of Patent: Mar. 3, 1992

[54] PROCESS OF TREATING RESIDUES OBTAINED BY PURIFICATION OF EXHAUST GAS

[75] Inventors: Harald Sauer, Frankfurt; Bernd Thöne, Friedberg, both of Fed. Rep. of Germany

[73] Assignee: Metallgesellschaft Aktiengesellschaft, Frankfurt am Main, Fed. Rep. of Germany

[21] Appl. No.: 394,607

[22] Filed: Aug. 16, 1989

[30] Foreign Application Priority Data

Sep. 13, 1988 [DE] Fed. Rep. of Germany ....... 3831128

[51] Int. Cl.⁵ .................................. C04B 18/06
[52] U.S. Cl. ................................ 106/705; 106/707; 106/DIG. 1; 423/432; 423/DIG. 20; 423/244; 405/128
[58] Field of Search ............... 423/555, 244, 242, 230, 423/432, 228, DIG. 20; 106/786, DIG. 1, 793, 900, 705, 707; 405/131, 128, 129; 210/714, 716

[56] References Cited

U.S. PATENT DOCUMENTS

| | | | |
|---|---|---|---|
| 2,802,719 | 8/1957 | Avedikian | 423/432 |
| 3,642,445 | 2/1972 | Muter et al. | 423/244 A |
| 3,855,125 | 12/1974 | Lin | 210/716 |
| 3,966,431 | 6/1976 | Craig et al. | 423/244 |
| 4,865,828 | 9/1989 | Lerner | 423/244 |

*Primary Examiner*—Gary P. Straub
*Attorney, Agent, or Firm*—Sprung Horn Kramer & Woods

[57] ABSTRACT

For a treatment of the residues which become available as dry dust in the purification of exhaust gas and contain, inter alia, 5 to 12% by weight CaO and have a conductance in excess of 6000 $\mu$S/cm, a process is proposed in which the residues are fluidized with purified exhaust gas in a circulating fluidized bed system consisting of a fluidized bed reactor, separator and recycling line and the CaO contained in the residues is reacted with the $CO_2$ contained in the exhaust gases to form $CaCO_3$.

4 Claims, 1 Drawing Sheet

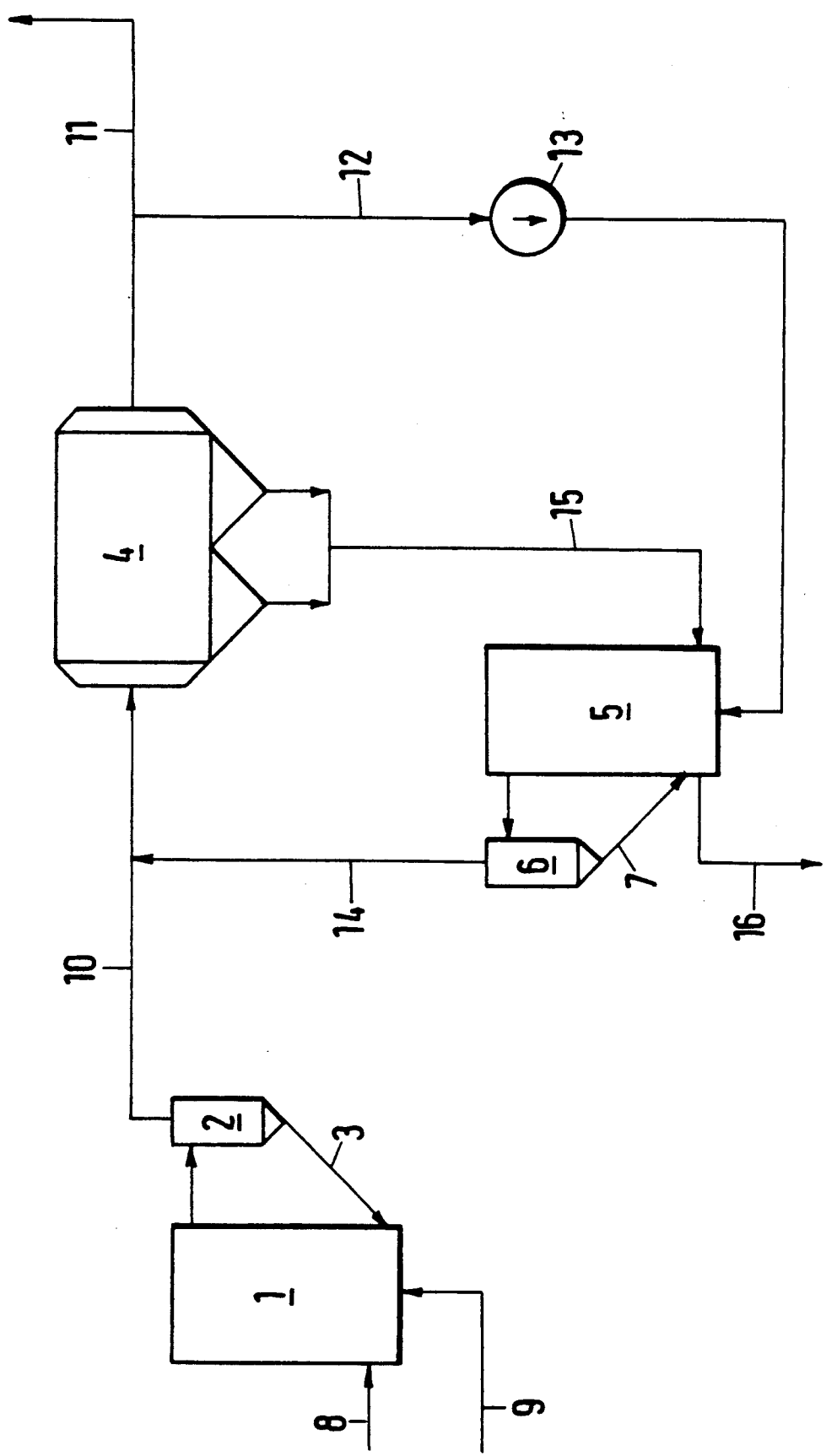

PROCESS OF TREATING RESIDUES OBTAINED BY PURIFICATION OF EXHAUST GAS

DESCRIPTION

This invention relates to a process of treating residues which have become available as dry dust in the purification of exhaust gas from power plants or the like and contain, inter alia, 5 to 12% by weight CaO and have a conductance in excess of 6000 μS/cm.

Owing to their relatively high CaO content, such residues cannot finally be disposed of in class 2 dumps so that they involve additional dumping costs, which amount to about 40. - - - deutschmarks per 1000 kg at present. It is an object of the invention to sufficiently convert the free CaO contained in the residues so that the residues can be admitted to class 2 dumps. The conversion should desirably afford distinct economical advantages over the additional dumping costs which were previously incurred.

To accomplish that object it is proposed that the residues are fluidized with purified exhaust gas in a circulating fluidized bed system consisting of a fluidized bed reactor, separator and recycling line and the CaO contained in the residues is reacted with the $CO_2$ contained in the exhaust gases to form $CaCO_3$.

The resulting calcium carbonate is insoluble in water so that it will not adversely affect the suitability of the residues for being dumped. The residues are suitably processed at 180° to 450° C. with a partial stream of the purified exhaust gases in an amount of about 10% of the total amount of exhaust gases. It will be desirable to control the rate of the partial stream in dependence on the CaO content of the residues that the amount of $CO_2$ which is available is always at least twice the amount which is stoichiometrically required for the reaction to form $CaCO_3$.

The temperature in the circulating fluidized bed system may be controlled by an injection of water. The CaO content of the residues should be sufficiently decreased so that they have a conductance below 2500 μS/cm.

Further details of the invention will be explained more fully with reference to the example of the process illustrated in FIG. 1.

The illustrated exhaust gas desulfurizer comprises a fluidized bed reactor 1, a separator 2 and a recycling line 3. In the desulfurizer, an exhaust gas stream supplied in line 9 is intensely mixed with a lime-containing sorbent powder that is supplied via line 8. As a result, the sulfur-containing gaseous polluants combine with the solid particles. To improve the utilization and to increase the solid content in the fluidized bed reactor 1 the solid particles are circulated through the separator 2 and the recycling line 3. An amount which corresponds to the supply via line 8 is withdrawn from the desulfurizer via line 10 and is separated from the exhaust gas stream in a gas-dedusting electrostatic precipitator 4. This results in line 15 in a mixture which consists of dust and of reacted and unreacted sorbent and which contains inter alia, 5 to 12% by weight CaO and for this reason must be supplied to an expensive special dump. The exhaust gas stream which has been desulfurized and dedusted leaves the plant in line 11.

In accordance with the invention the mixture which has been obtained in the gas-dedusting electrostatic precipitator is supplied via line 15 to an aftertreatment in a circulating fluidized bed system, which consists of a fluidized bed reactor 5, a separator 6 and a recycling line 7. The fluidizing gas consists of a part of the purified exhaust gas, which is supplied by means of a blower 13 through line 12 into the fluidized bed reactor 5. As in the circulating fluidized bed system for desulfurizing, the solid particles are circulated so that the desired reaction of the CaO with the $CO_2$ in the exhaust gas will be improved and the contact between gas and solids will be intensified. A residue which is substantially free of CaO is then withdrawn from the system via line 16. The partial stream of exhaust gas is returned to the main stream exhaust gas via line 14. The aftertreatment is effected at 180° to 450° C. The temperature may be controlled by an injection of water into the fluidized bed reactor 5. The rate of the partial stream of exhaust gas amounts to about 10% of the rate of the entire stream of exhaust gas. It will be so controlled in any case that $CO_2$ will always be "offered" at twice the rate which is stoichiometrically required for the reaction with the CaO.

We claim:

1. A process of treating residues which have become available as dry dust in the dry purification of exhaust gas from a power plant and contain 5 to 12% by weight CaO and have a conductance in excess of 6000 μS/cm, comprising fluidizing said residues with purified exhaust gas in a circulating fluidized bed system consisting of a fluidized bed reactor, separator and recycling line, and essentially completely reacting the CaO contained in the residue with the $CO_2$ contained in the exhaust gas at a temperature from 180° to 450° C. to form $CaCO_3$, treated residue having a conductance below about 2500 μS/cm.

2. A process according to claim 1, wherein about 10% of the power plant exhaust gas is employed as the purified exhaust gas for the circulating fluidized bed reactor.

3. A process according to claim 1, wherein the exhaust gas is supplied in an amount such that there is present in the reactor at least twice the amount stoichiometrically required to convert the CaO in the residue to $CaCO_3$.

4. A process according to claim 1, including the step of injecting water into the circulating fluidized bed reactor to control the temperature therein.

* * * * *